US010963420B2

(12) United States Patent
Klimetschek et al.

(10) Patent No.: US 10,963,420 B2
(45) Date of Patent: Mar. 30, 2021

(54) SYSTEMS AND METHODS FOR PROVIDING HOT SPARE NODES

(75) Inventors: Alexander Klimetschek, Berlin (DE); Lars Trieloff, Potsdam (DE)

(73) Assignee: Adobe Inc., San Jose, CA (US)

( * ) Notice: Subject to any disclaimer, the term of this patent is extended or adjusted under 35 U.S.C. 154(b) by 976 days.

(21) Appl. No.: 13/572,321

(22) Filed: Aug. 10, 2012

(65) Prior Publication Data

US 2014/0047086 A1 Feb. 13, 2014

(51) Int. Cl.
*G06F 15/177* (2006.01)
*G06F 9/50* (2006.01)
*G06F 11/20* (2006.01)

(52) U.S. Cl.
CPC .......... *G06F 15/177* (2013.01); *G06F 9/5072* (2013.01); *G06F 11/2041* (2013.01); *G06F 2209/5011* (2013.01)

(58) Field of Classification Search
CPC .. G06F 15/177; G06F 9/5702; G06F 11/2041; G06F 2209/5011
See application file for complete search history.

(56) References Cited

U.S. PATENT DOCUMENTS

| | | | | |
|---|---|---|---|---|
| 6,223,202 B1 * | 4/2001 | Bayeh | ................... | G06F 9/5027 718/1 |
| 6,779,016 B1 * | 8/2004 | Aziz | ..................... | G06F 9/5072 709/201 |
| 7,584,340 B1 * | 9/2009 | Colgrove | .............. | G06F 3/0608 360/48 |
| 7,788,521 B1 * | 8/2010 | Sim-Tang | ..................... | 714/4.12 |
| 8,078,728 B1 * | 12/2011 | Pollan | ................... | G06F 9/5077 709/223 |
| 8,296,434 B1 * | 10/2012 | Miller et al. | ................... | 709/226 |
| 8,527,578 B2 * | 9/2013 | DeHaan | ................. | H04L 67/34 709/203 |
| 8,572,602 B1 * | 10/2013 | Colton et al. | ................. | 717/177 |
| 2003/0051236 A1 | 3/2003 | Pace et al. | | |

(Continued)

FOREIGN PATENT DOCUMENTS

| CA | 2376333 A1 * | 3/2001 | ........... G06G 9/5072 |
|---|---|---|---|
| CA | 2376333 A1 * | 3/2001 | ........... G06F 9/5072 |

(Continued)

OTHER PUBLICATIONS

Sun et al, Simplifying Service Deployment with Virtual Appliances, 2008 IEEE International Conference on Services Computing, IEEE, 2008, pp.*

(Continued)

*Primary Examiner* — Emmanuel L Moise
*Assistant Examiner* — Robert A Shaw
(74) *Attorney, Agent, or Firm* — Kilpatrick Townsend & Stockton LLP

(57) ABSTRACT

Systems and methods for providing hot spare nodes are disclosed. For example, one disclosed method for providing hot spare nodes comprises receiving an indication of a first quantity of unallocated nodes, the first quantity greater than or equal to one; receiving a command configured to create a hot spare pool and causing the first quantity of unallocated nodes to be configured as a first quantity of configured nodes; and generating the hot spare pool, the hot spare pool comprising the first quantity of configured nodes.

18 Claims, 10 Drawing Sheets

(56) References Cited

U.S. PATENT DOCUMENTS

| | | | | |
|---|---|---|---|---|
| 2003/0105810 A1* | 6/2003 | McCrory | H04L 29/06 | 709/203 |
| 2006/0107106 A1* | 5/2006 | Michaelis | G06F 11/2051 | 714/11 |
| 2007/0078988 A1* | 4/2007 | Miloushev | G06F 9/485 | 709/227 |
| 2008/0201711 A1* | 8/2008 | Amir Husain | G06F 9/445 | 718/1 |
| 2009/0254572 A1* | 10/2009 | Redlich | G06Q 10/06 | |
| 2009/0276771 A1* | 11/2009 | Nickolov | G06F 9/4856 | 717/177 |
| 2009/0293056 A1* | 11/2009 | Ferris | G06F 9/5077 | 718/1 |
| 2009/0300151 A1* | 12/2009 | Friedman et al. | | 709/222 |
| 2009/0300210 A1* | 12/2009 | Ferris | G06F 9/5077 | 709/235 |
| 2010/0027552 A1* | 2/2010 | Hill | H04L 12/66 | 370/401 |
| 2010/0088205 A1* | 4/2010 | Robertson | G06Q 20/102 | 705/34 |
| 2010/0131649 A1* | 5/2010 | Ferris | G06F 9/5072 | 709/226 |
| 2010/0169477 A1* | 7/2010 | Stienhans | G06F 9/5083 | 709/224 |
| 2010/0223378 A1* | 9/2010 | Wei | H04L 41/0896 | 709/224 |
| 2010/0228839 A1* | 9/2010 | Pal | G06F 8/61 | 709/221 |
| 2010/0299366 A1* | 11/2010 | Stienhans et al. | | 707/803 |
| 2010/0312540 A1* | 12/2010 | Jess | G06F 3/0605 | 703/21 |
| 2011/0016214 A1* | 1/2011 | Jackson | G06F 9/5044 | 709/226 |
| 2011/0029675 A1* | 2/2011 | Yeow | G06F 11/2041 | 709/226 |
| 2011/0055810 A1* | 3/2011 | DeHaan | G06F 21/6272 | 717/120 |
| 2011/0078303 A1* | 3/2011 | Li et al. | | 709/224 |
| 2011/0131335 A1* | 6/2011 | Spaltro | G06F 9/5072 | 709/228 |
| 2011/0138050 A1* | 6/2011 | Dawson | G06F 9/5072 | 709/226 |
| 2011/0213686 A1* | 9/2011 | Ferris | G06F 9/505 | 705/34 |
| 2011/0213884 A1* | 9/2011 | Ferris | G06F 9/50 | 709/226 |
| 2011/0225107 A1* | 9/2011 | Khosravy | G06Q 10/10 | 706/12 |
| 2011/0252432 A1* | 10/2011 | Sim-Tang et al. | | 719/318 |
| 2011/0258621 A1* | 10/2011 | Kern | G06F 9/5072 | 718/1 |
| 2011/0276951 A1* | 11/2011 | Jain | G06F 11/3006 | 717/140 |
| 2011/0295986 A1* | 12/2011 | Ferris et al. | | 709/222 |
| 2011/0296303 A1 | 12/2011 | Duquene et al. | | |
| 2011/0320444 A1* | 12/2011 | Yehaskel | G06Q 30/02 | 707/723 |
| 2011/0320605 A1* | 12/2011 | Kramer et al. | | 709/226 |
| 2012/0005359 A1* | 1/2012 | Seago | G06F 9/5044 | 709/230 |
| 2012/0005584 A1* | 1/2012 | Seago | G06F 11/32 | 715/738 |
| 2012/0017112 A1* | 1/2012 | Broda et al. | | 714/4.4 |
| 2012/0042055 A1* | 2/2012 | Agarwala | G06F 9/5061 | 709/220 |
| 2012/0047443 A1* | 2/2012 | Tarkoma | G06F 3/0481 | 715/744 |
| 2012/0096165 A1* | 4/2012 | Madduri | G06F 9/5011 | 709/226 |
| 2012/0110055 A1* | 5/2012 | Van Biljon | G06Q 30/04 | 709/201 |
| 2012/0131578 A1* | 5/2012 | Ciano | G06F 9/45558 | 718/1 |
| 2012/0179824 A1* | 7/2012 | Jackson | G06F 9/5027 | 709/226 |
| 2012/0185913 A1* | 7/2012 | Martinez | G06F 9/455 | 726/1 |
| 2012/0198073 A1* | 8/2012 | Srikanth | G06F 9/5027 | 709/226 |
| 2012/0204169 A1* | 8/2012 | Breiter | G06F 9/44526 | 717/171 |
| 2012/0222106 A1* | 8/2012 | Kuehl | H04L 63/0209 | 726/11 |
| 2012/0233118 A1* | 9/2012 | Holt et al. | | 707/620 |
| 2012/0240243 A1* | 9/2012 | Allardyce | G06Q 10/10 | 726/28 |
| 2012/0259982 A1* | 10/2012 | Tatsubori | G06F 9/5027 | 709/226 |
| 2012/0266159 A1 | 10/2012 | Risbood et al. | | |
| 2012/0297059 A1* | 11/2012 | Bross | | 709/224 |
| 2012/0303740 A1* | 11/2012 | Ferris | H04L 29/06 | 709/217 |
| 2012/0311156 A1* | 12/2012 | DeJana et al. | | 709/226 |
| 2013/0024496 A1* | 1/2013 | Krishnan | G06F 9/505 | 709/203 |
| 2013/0024573 A1* | 1/2013 | Kushida | G06F 9/5072 | 709/226 |
| 2013/0036091 A1* | 2/2013 | Provenzano | G06F 17/30162 | 707/624 |
| 2013/0042083 A1* | 2/2013 | Mutalik | G06F 17/30162 | 711/162 |
| 2013/0080603 A1* | 3/2013 | Simons et al. | | 709/220 |
| 2013/0091557 A1* | 4/2013 | Gurrapu | H04W 4/60 | 726/5 |
| 2013/0103837 A1* | 4/2013 | Krueger | G06F 9/5072 | 709/226 |
| 2013/0111260 A1* | 5/2013 | Reddy et al. | | 714/4.11 |
| 2013/0152078 A1* | 6/2013 | Arcilla et al. | | 718/1 |
| 2013/0198368 A1 | 8/2013 | Patterson et al. | | |
| 2013/0227558 A1* | 8/2013 | Du | G06F 9/45558 | 718/1 |
| 2013/0232498 A1* | 9/2013 | Mangtani | G06F 9/5072 | 718/104 |
| 2013/0275961 A1* | 10/2013 | Anderson | G06F 9/5072 | 717/177 |
| 2013/0291126 A1* | 10/2013 | Thomson | G06F 16/94 | 726/30 |
| 2013/0297738 A1* | 11/2013 | Tarkoma | | 709/217 |
| 2013/0304923 A1* | 11/2013 | Clay et al. | | 709/226 |
| 2014/0007079 A1* | 1/2014 | Whitney | H04L 67/10 | 717/176 |
| 2014/0040656 A1* | 2/2014 | Ho | G06F 9/5077 | 714/3 |
| 2014/0047095 A1* | 2/2014 | Breternitz | G06F 9/5072 | 709/224 |
| 2014/0047341 A1* | 2/2014 | Breternitz | G06F 9/505 | 715/735 |
| 2014/0047342 A1* | 2/2014 | Breternitz | G06F 9/5061 | 715/735 |
| 2014/0164620 A1* | 6/2014 | Tamura | G06F 9/5072 | 709/226 |
| 2014/0214503 A1* | 7/2014 | Chircorian | G06Q 10/10 | 705/14.4 |
| 2014/0282944 A1* | 9/2014 | Li | H04L 41/18 | 726/6 |

FOREIGN PATENT DOCUMENTS

| | | | | |
|---|---|---|---|---|
| CN | 202565304 U | * | 11/2012 | |
| WO | WO-0114987 A2 | * | 3/2001 | G06F 9/5072 |
| WO | WO 03021396 A2 | * | 3/2003 | G06F 9/5077 |
| WO | WO 2004059503 A1 | * | 7/2004 | H04L 29/06 |
| WO | WO 2012086868 A1 | * | 6/2012 | G06F 17/3089 |

(56) References Cited

FOREIGN PATENT DOCUMENTS

| WO | WO 2013033664 A2 | * | 3/2013 | ............. G06Q 10/10 |
| WO | WO-2013033664 A2 | * | 3/2013 | ............. G06Q 10/10 |

OTHER PUBLICATIONS

Chaczko et al., "Availability and Load Balancing in Cloud Computing", 2011 International Conference on Computer and Software Modeling, IPCSIT vol. 14, 2011, pp. 134-140.*

Dias et al., "A Scalable and Highly Available Web Server", Compcon 1996, IEEE, 1996, pp. 85-92.*

Baun et al, A Taxonomy Study on Cloud Computing Systems and Technologies, Cloud Computing, CRCnet (Oct. 2011), ch. 4, pp. 73-90.*

Hacker, Toward a Reliable Cloud Computing Service, Cloud Computing and Software Services Theory and Techniques, CRCnet (Jul. 2010), ch. 6, pp. 139-152.*

Dejun et al, Resource Provisioning of Web Applications in Heterogeneous Clouds, Proceedings of the 2nd USENIX conference on Web application development.*

Dejun et al, Resource Provisioning of Web Applications in Heterogeneous Clouds, WebApps'11, Proceedings of the 2nd USENIX conference on Web application development, Jun. 2011.*

T. Hacker, "Toward a Reliable Cloud Computing Service" in Cloud Computing and Software Services, Cloud Computing and Software Services Theory and Techniques (Chapter 6) CRCnet, Jul. 2010).*

L. He, S. Smith, R. Willenborg, and Q. Wang. Automating deployment and activation of virtual images. Technical Report 0708, IBM WebSphere Journal, 2007.*

Notice of Allowance from related U.S. Appl. No. 13/572,330, dated Nov. 20, 2015, 11 pages.

* cited by examiner

US 10,963,420 B2

SYSTEMS AND METHODS FOR PROVIDING HOT SPARE NODES

FIELD

The present invention generally relates to cloud computing and more specifically relates to providing hot spare nodes.

BACKGROUND

Cloud computing has become a more prevalent technology and provides users with computing functionality or data storage as a service, rather than via the purchase of a software application or computer hardware for installation in the user's own computer system. Users of cloud computing services are typically provided with access to the desired functionality over a network connection to a cloud service provider (CSP), which offers the desired services to the user. For example, a user may obtain storage space within a cloud environment, such as by purchasing access rights to the storage space from a CSP, though a user may also construct and configure his own cloud environment. The user may then use the storage space by accessing the cloud environment rather than a specific server. The CSP typically manages the details of where data is physically stored, maintaining storage quotas, and performing data backups. Cloud environments provide advantages in that the service(s) requested by the user may be accessed from multiple locations and may provide a more cost-effective way to add redundant data storage or computing capacity than buying and maintaining additional computers.

SUMMARY

Embodiments according to the present disclosure provide systems and methods for providing hot spare nodes. For example, one disclosed embodiment is a method comprising receiving an indication of a first quantity of unallocated nodes, the first quantity greater than or equal to one; receiving a command configured to create a hot spare pool and causing the first quantity of unallocated nodes to be configured as a first quantity of configured nodes; and generating the hot spare pool, the hot spare pool comprising the first quantity of configured nodes. In another embodiment, a computer-readable medium comprises program code for causing one or more processors to execute such a method.

These illustrative embodiments are mentioned not to limit or define the disclosure, but rather to provide examples to aid understanding thereof. Illustrative embodiments are discussed in the Detailed Description, which provides further description of the disclosure. Advantages offered by various embodiments of this disclosure may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of systems and methods for providing hot spare nodes. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

Illustrative Method for Providing Hot Spares

Figure 1A:
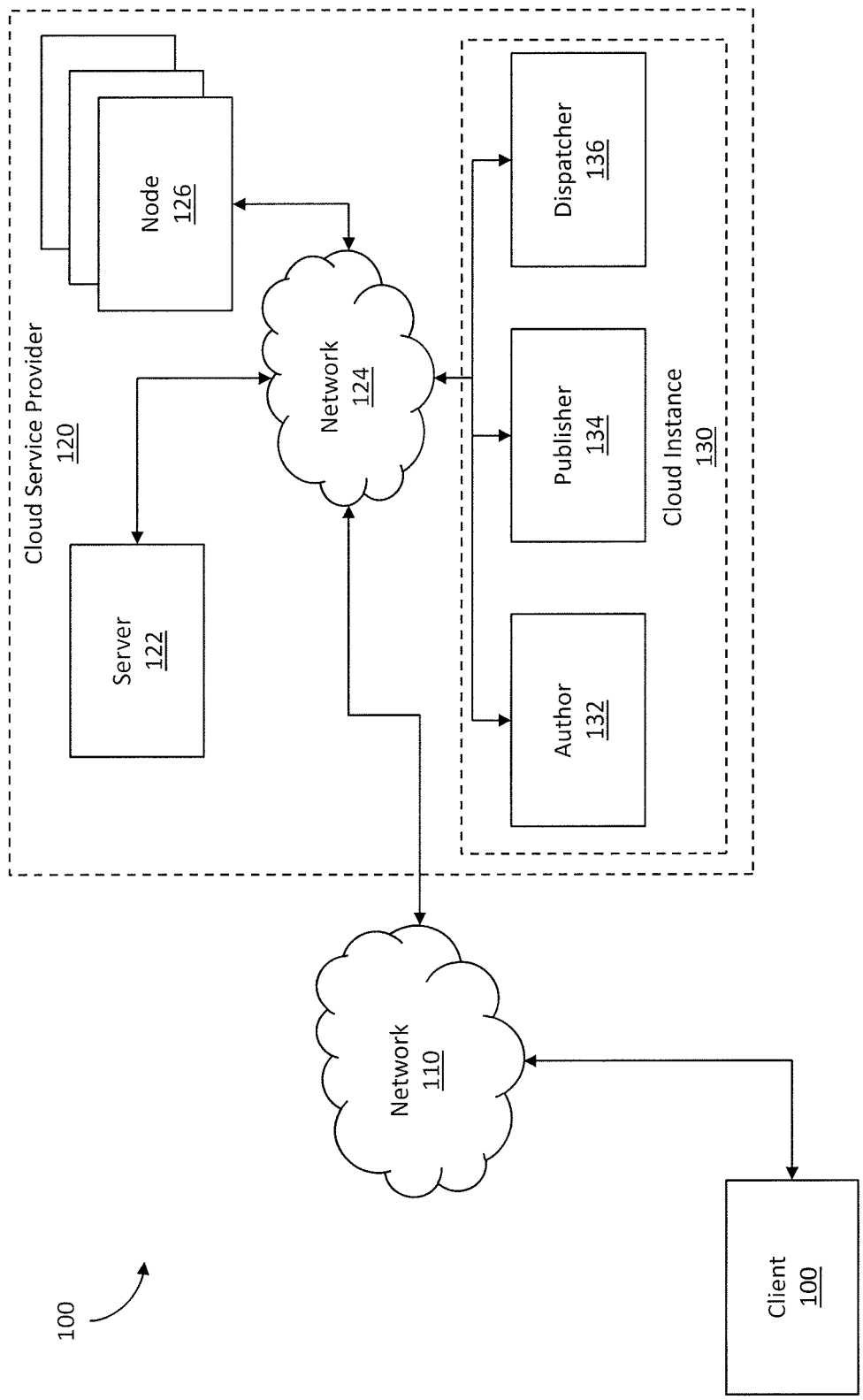
FIGS. 1A-3C show systems for providing hot spare nodes according to embodiments of this disclosure.

In one illustrative embodiment, a user administers a cloud instance having a number of nodes, including an authoring node, a publisher node, and a dispatcher node. In this embodiment, the authoring node includes software and tools to allow a user to develop and test new web content, such as new websites or web applications. The publisher node provides access to web content developed on an authoring node that has been "published" and made available for access on the Internet. The dispatcher node provides load balancing functionality. For example, if the cloud instance is later expanded to include multiple publisher nodes to accommodate increased traffic to a web site, the dispatcher can provide load balancing between the multiple publisher nodes. FIG. 1A, which will be discussed in more detail below, shows an example configuration of such a cloud instance 130 that includes an authoring node 132, a publisher node 134, and a dispatcher node 136.

To increase the capacity of the cloud instance, such as to provide additional publisher nodes, the user can configure and add additional nodes to the cloud instance. However, the process of installing and configuring a new node can take 30 or more minutes, meaning there may be a significant delay between when additional capacity is needed and when the additional capacity becomes available for use. To help prevent this from occurring, the user may create a pool of hot spare nodes.

Figure 2A:
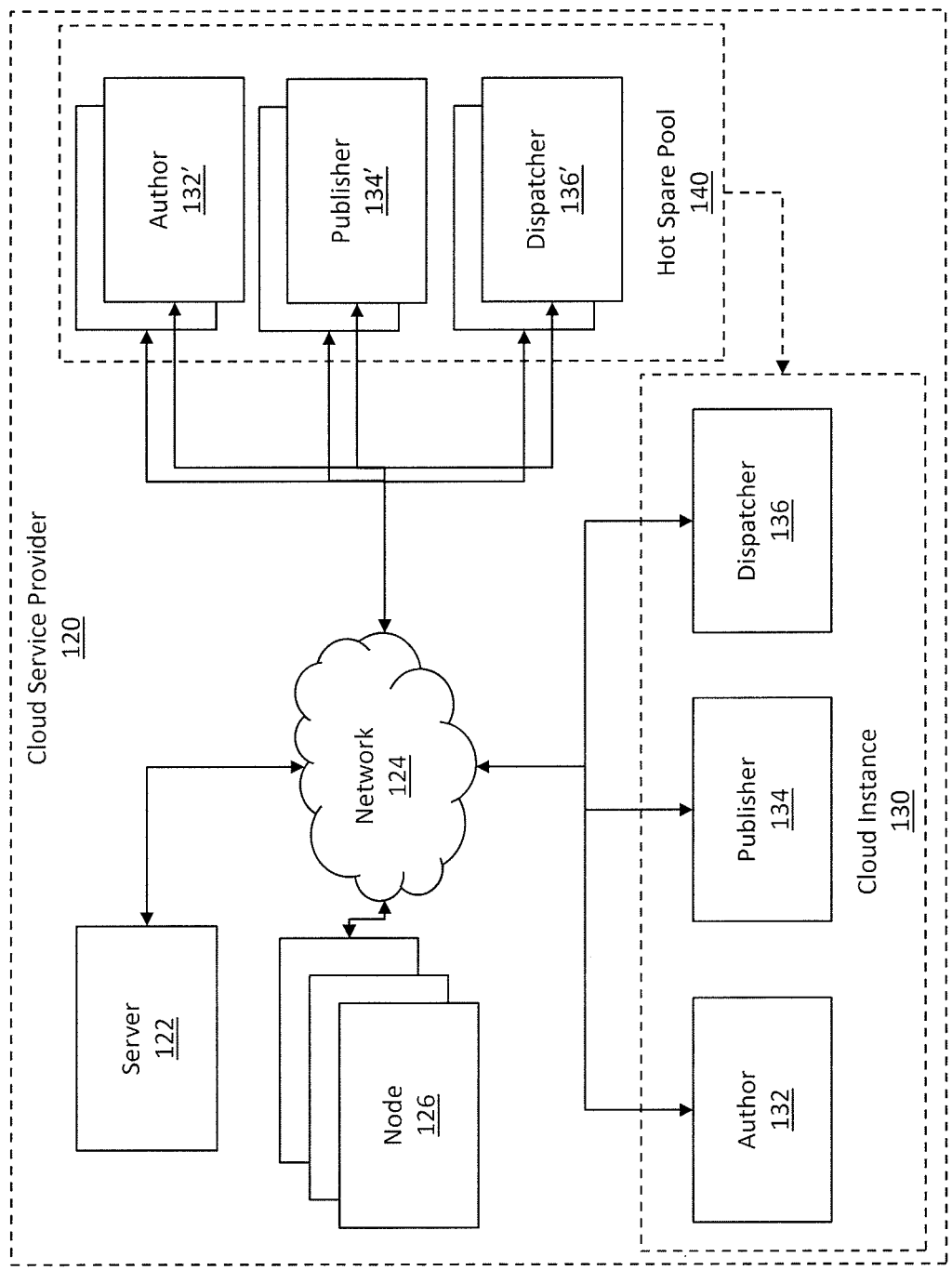

To create a hot spare pool 140, the user accesses a software application for managing the user's cloud instance. In this case, the application is a web-based application that is accessed using a standard web browser. The user logs into the application and selects an option to create a new hot spare pool. To create the hot spare pool, the user enters the quantity of each type of node to maintain in the pool, such as 2 author nodes, 2 publisher nodes, and 2 dispatcher nodes. For example, FIG. 2A shows such a hot spare pool 140 that has two of each type of node: author, publisher, and dispatcher. After the user has entered the quantity of each type of node to maintain in the hot spare pool, the user presses a button to create the hot spare pool.

After the user commands the application to create the hot spare pool, the application requests a number of nodes from the CSP and configures them according to the user's selection, in this case, the application requests 6 nodes from the CSP and configures 2 as authoring nodes, 2 as publisher nodes, and 2 as dispatcher nodes. Suitable methods for requesting and configuring such nodes are described in co-pending U.S. patent application Ser. No. 13/572,330, entitled "Systems and Methods for Cloud Management," the entirety of which is hereby incorporated by reference.

After the nodes have been configured appropriately, they are maintained in an offline, stand-by state. In this state, most of the configuration required for the node to be used has been completed, though a few more steps will be performed once a node is activated.

Figure 2B:
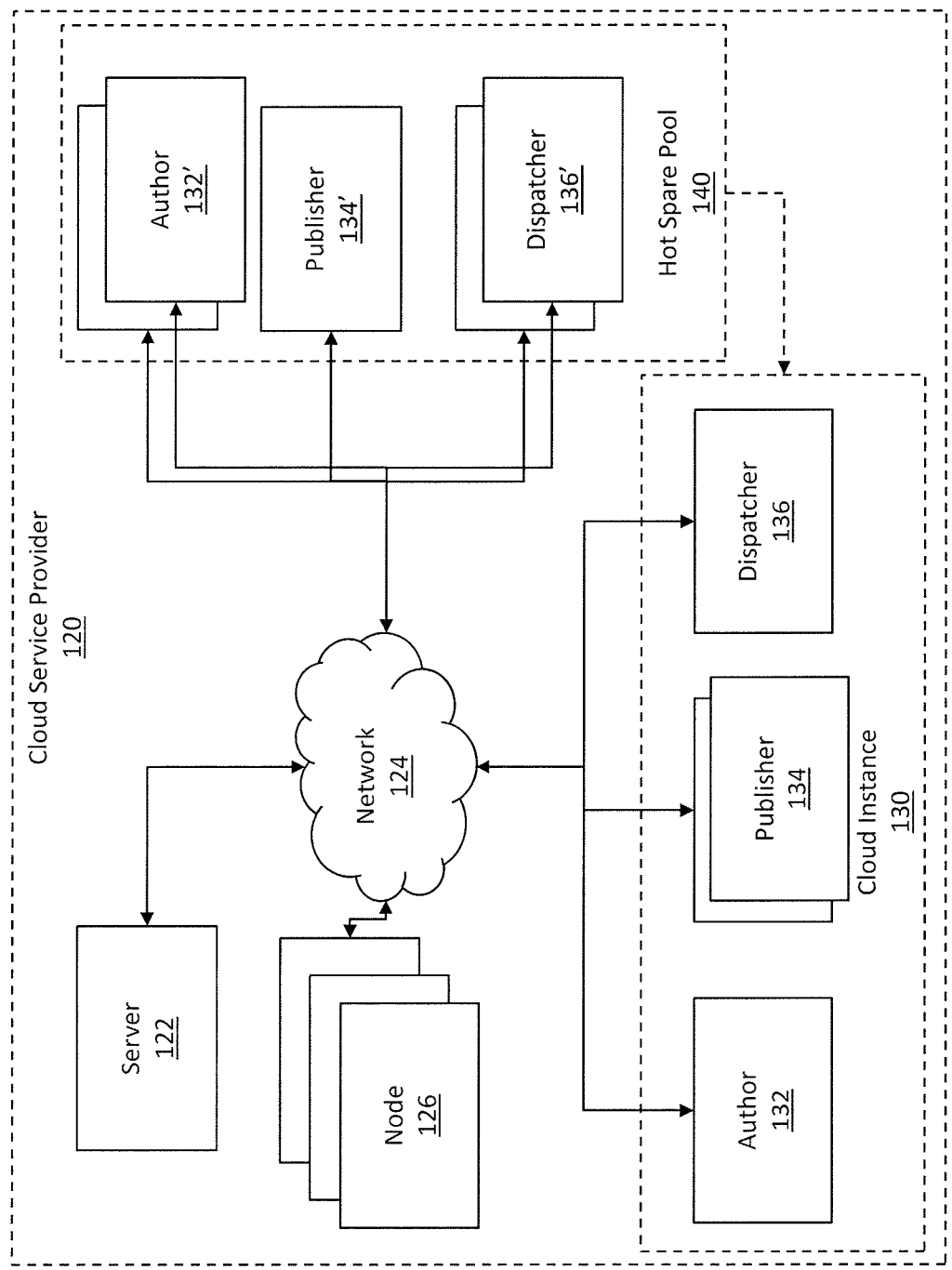

Once the hot spare pool is populated with available nodes, the user may transition any or all of the available hot spare nodes 132', 134', 136' to the live cloud instance 130. To do so, the user selects how many nodes, and of which type, to move from the hot spare pool 140 to the cloud instance 130 and instructs the application to transition the nodes to the cloud instance 130. The application then performs any final configuration, such as changing IP addresses on the nodes to be transitioned to correspond to the cloud instance 130 and to register the new node(s) with existing dispatcher nodes 136, and the transferred nodes then become a part of the live cloud instances 130. For example, in FIG. 2B, a publisher node 134' has been transitioned to the cloud instance 130, leaving only one publisher node 134' in the hot spare pool 140.

Figure 2C:
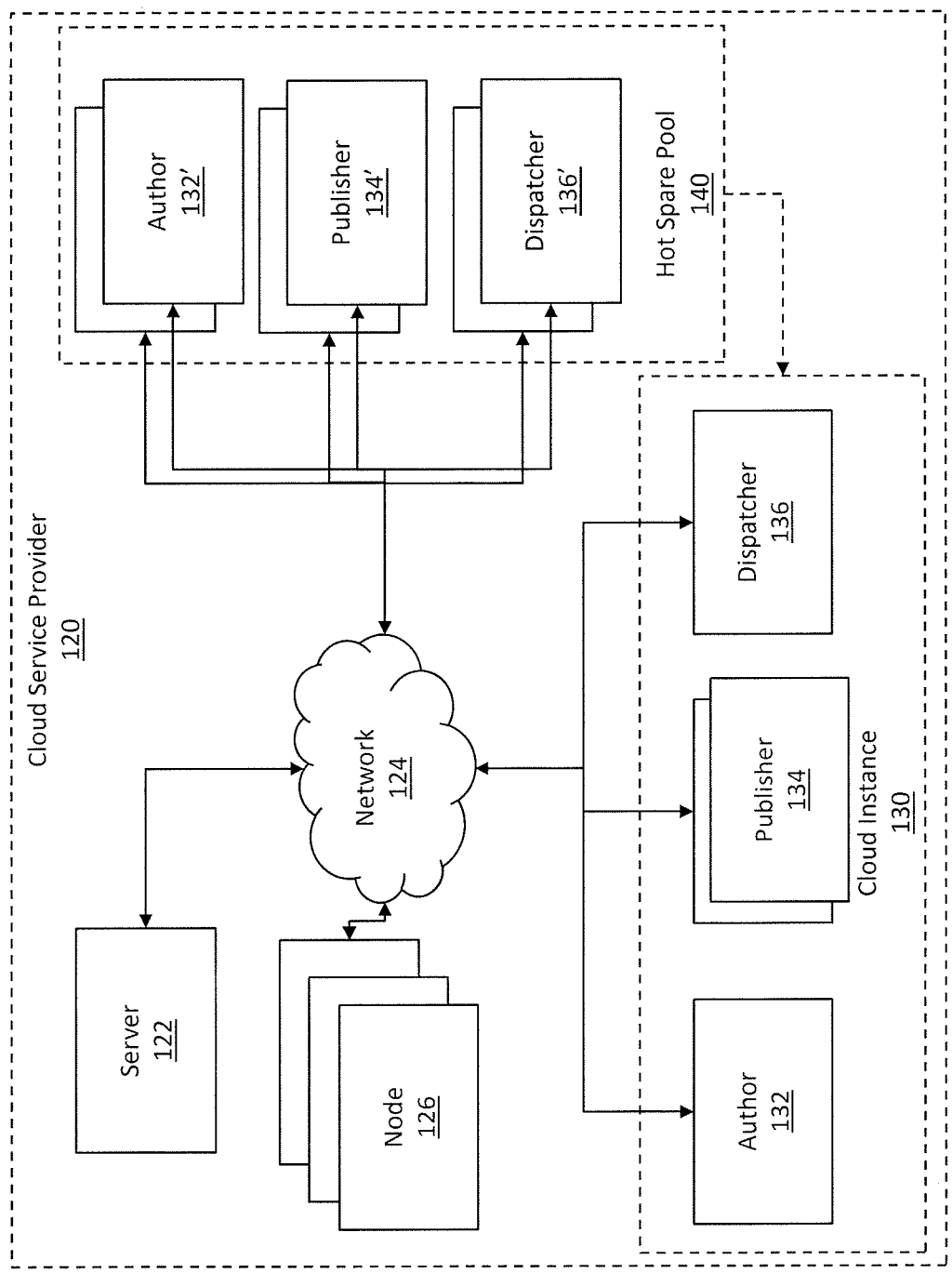

After one or more nodes have been transitioned to the cloud instance, the application then creates replacement hot spare nodes to replenish the nodes such that the hot spare pool remains at its configured capacity. FIG. 2C shows the cloud instance 130 with the newly added publisher node 134, and the hot spare pool with the replenished publisher node 134'.

This illustrative example is given to introduce the reader to the general subject matter discussed herein and this disclosure is not limited to this example. The following sections describe various additional non-limiting embodiments and examples of devices, systems, and methods for providing hot spare nodes.

Referring now to FIG. 1A, FIG. 1A shows a system 100 for providing hot spares according to one embodiment. In the embodiment shown, the system 100 comprises a client computer 100 that is in communication with a CSP 120 over network 110, which is in communication within a network 124 internal to the CSP. The client computer 100 comprises a processor and a computer-readable medium (not shown). The client computer's processor is in communication with the computer-readable medium and is configured to execute program code stored thereon. For example, in this embodiment, the client computer's processor is configured to execute a standard web browser stored in the processor's computer-readable medium. However, in some embodiments, the client computer's processor may be configured to execute a locally-installed software application for providing hot spare nodes.

The client computer 100 is in communication with the CSP 120 via network 110. In this embodiment the network 110 comprises the Internet; however in other embodiments, the network 110 may comprise any type of network, including local area networks (LANs) and wide area networks (WANs). The network 110 is in communication with the CSP's internal network 124. In this embodiment, the CSP network 124 comprises a LAN, but in other embodiments, the CSP network 124 may comprise any type of network, such as those discussed above. In some embodiments, the CSP network 124, or network 110 or both, may comprise a virtual network, such as a virtual private network (VPN). In some embodiments, the client computer 110 may be directly coupled to the CSP network 124 without the use of another network 110. For example, in one embodiment, a company may provide its own cloud environment on its own internal network 124. In one such embodiment, the cloud environment is made available to one or more client computers 110 located on the same network 124.

Figure 1B:
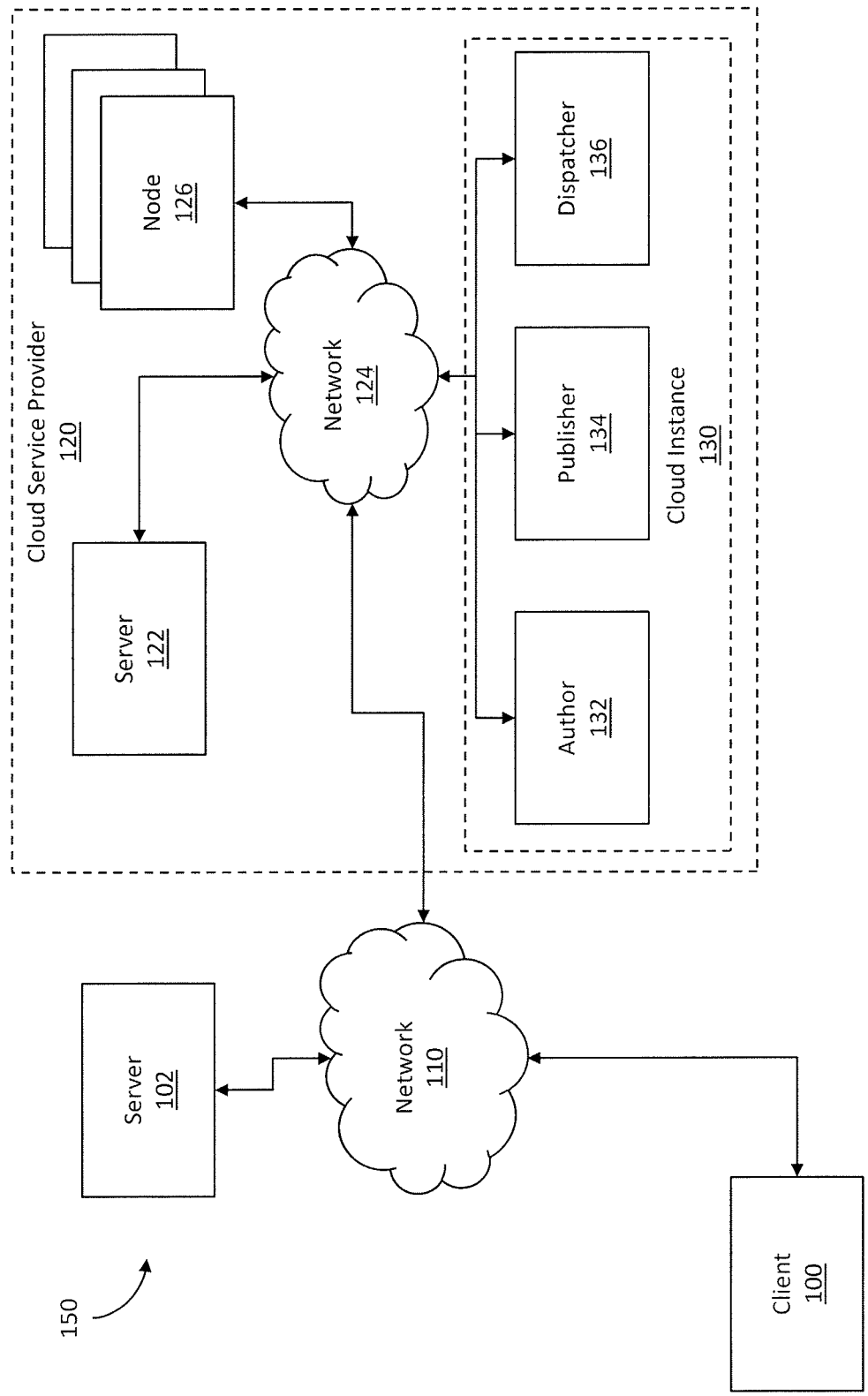

In the embodiment shown in FIG. 1A, the CSP 120 includes a server 122, CSP network 124, a plurality of nodes 126, and a cloud instance 130, which includes an author node 132, a publisher node 134, and a dispatcher node 136. The server 122 is configured to receive communication requests from the client computer 122 and to serve as an interface between the client computer 100 and the CSP 120. For example, in one embodiment, a user may execute a web browser on the client computer 100 and navigate to a web page provided by the CSP 120 that resides on server 122 that includes a web application embodying one embodiment according to the present disclosure. In another embodiment, a web application is hosted by a third-party service provider, such as on server 102 as shown in FIG. 1B. In one such embodiment, the third party service provider provides a web application for providing hot spare nodes, which interfaces with one or more CSPs to perform one or more functions or method steps as discussed herein.

In a web-based embodiment, as the user works in the web application, a server, such as server 102 or server 122, may issue one or more commands or requests to the cloud instance 130, or the server 102, 122 may transfer the connection from the client computer 100 to one or more of the nodes 132-136 within the cloud instance 130. For example after a user logs into a user session in the web application running on the server 102 or server 122, the user may select an option to use authoring tools resident on the authoring node 132, at which time the server 102 or server 122 transfers the user's session to the authoring tool.

The CSP also provides a plurality of nodes 126 for use by a user. In the embodiment shown in FIG. 1A, a node comprises a discrete computing unit that includes processing capabilities, memory in which to execute one or more applications, and non-volatile storage for persistent storage of data or applications. For example, in one embodiment a node may comprise a discrete physical computer having one or more microprocessors, a quantity of random access memory (RAM), and one or more hard drives. In one embodiment, a node may comprise one of a plurality of virtual servers executing within a single physical computer, where each of the plurality of virtual servers is provided with access to one or more microprocessors, a quantity of RAM, and storage space on one or more hard drives. In some embodiments, a node may be provided by a plurality of physical computers that have been linked together, such as in a cluster. In some embodiments, non-volatile storage for a node may be provided in a separate dedicated storage device, such as within a physical computer having a large quantity of persistent storage or within a storage area network. Still further embodiments of suitable nodes comprise one or more combinations of processing capability, memory for application execution, and memory for persistent storage.

Further, nodes within the CSP's cloud environment may not be identically configured. For example, the CSP 120 may provide a variety of different nodes that may have different configurations. For example, in one embodiment, a CSP 120 may offer three different types of nodes (e.g. small, medium, and large) with increasing amounts of processing capacity, application memory, and persistent storage. Some embodiments may comprise other types of nodes or node combinations.

In the embodiment shown in FIG. 1A and as discussed above, a node represents a discrete computing unit with certain characteristics. A node that is idle and has not been allocated to one of the CSP's customers is available for allocation to a customer and for being configured by the customer for the customer's particular needs. In the embodiment of FIG. 1A, the nodes 132-136 of the cloud instance 130 comprise nodes 126 that have been allocated to the cloud instance and have been configured as an authoring node 132, a publisher node 134, and a dispatcher node 136 by a customer of the CSP 120. At a later time, if the customer decides to discontinue use of the cloud instance 130 or one or more of the nodes 132-136 comprised within the cloud instance 130, the user may release the node (or nodes) to the CSP 120, which may then return it to a pool of idle, unallocated nodes 126. Thus, the CSP 120 may provide readily available, scalable, configurable processing capabilities for one or more customers.

Figure 1C:
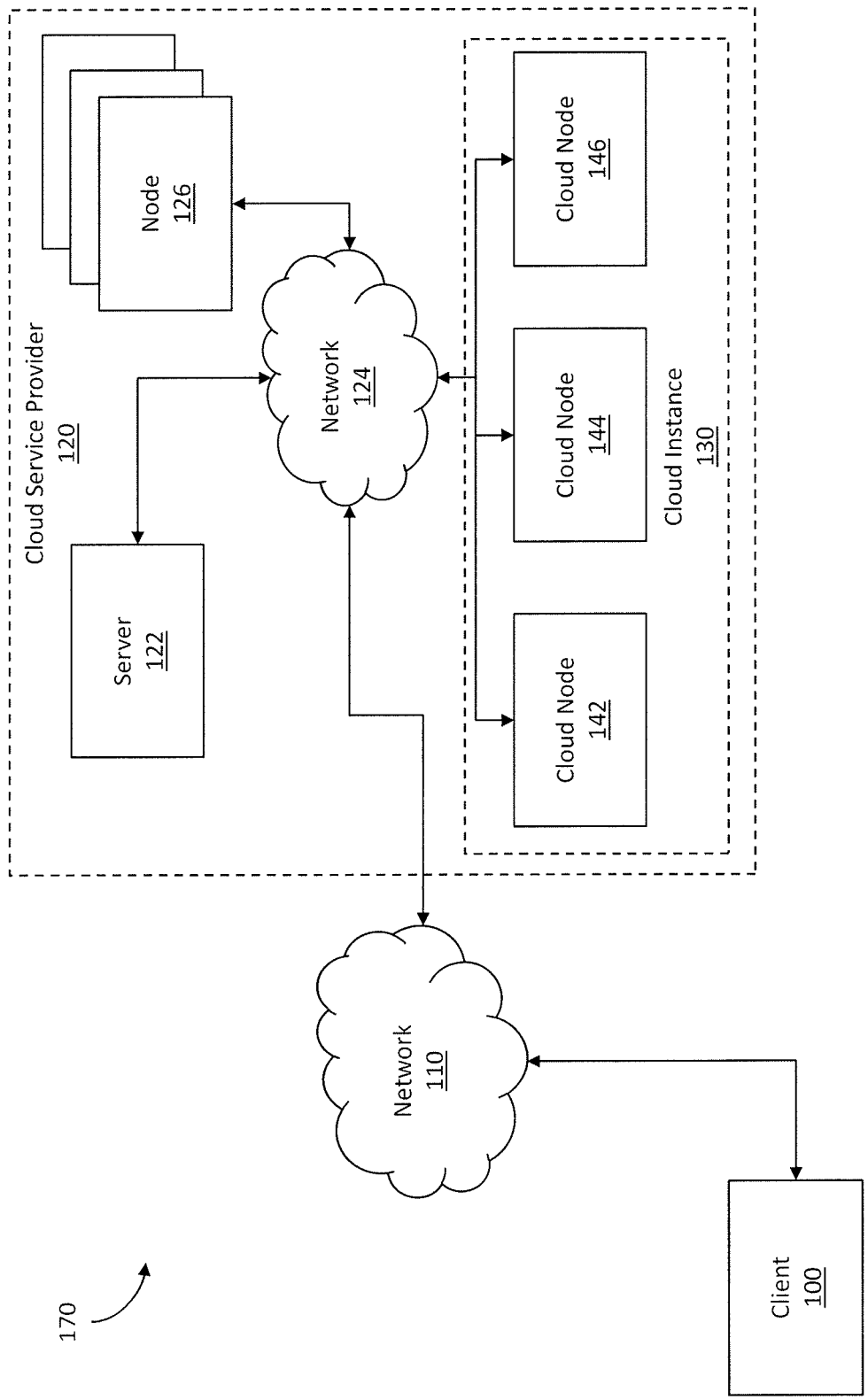

While the embodiment shown in FIG. 1A comprises three particular types of nodes (author, publisher, dispatcher), other cloud instances may comprise other types of nodes. For example, the system 170 shown in FIG. 1C generally resembles the system 100 shown in FIG. 1A; however, the cloud instances comprises three cloud nodes 142-146. Each of these nodes has been configured according to a user's particular needs and may comprise the same or different functionality. For example, in one embodiment, a user may configure each of the plurality of nodes 142-146 to perform graphics rendering. In another embodiment, a user may configure one node 142 to perform graphics rendering, another node 144 to provide a content creation application, and a further node 146 to provide video editing functionality. In one embodiment, one or more nodes may be configured as file servers or as storage devices. And while the systems 100, 150, 170 shown in FIGS. 1A-C each have cloud instances comprising three nodes, cloud instances may a fewer number of nodes or a greater number of nodes. Further, in the embodiment shown in FIG. 1A, where there is an equal number of author, publisher, and dispatcher nodes shown in the cloud instance 130, such a configuration is not necessary. For example, different quantities of each node type may be included, including zero of one or more types. For example, in one embodiment, a cloud instance 130 comprises one publisher node, and no author or dispatcher nodes.

In some embodiments, a CSP 120 may be a third-party CSP that allows one or more users to purchase subscriptions or access to CSP cloud services, while in some instances, an entity may create its own cloud environment and act as its own CSP 120, such as to provide cloud services to employees within a company.

Figure 3A:
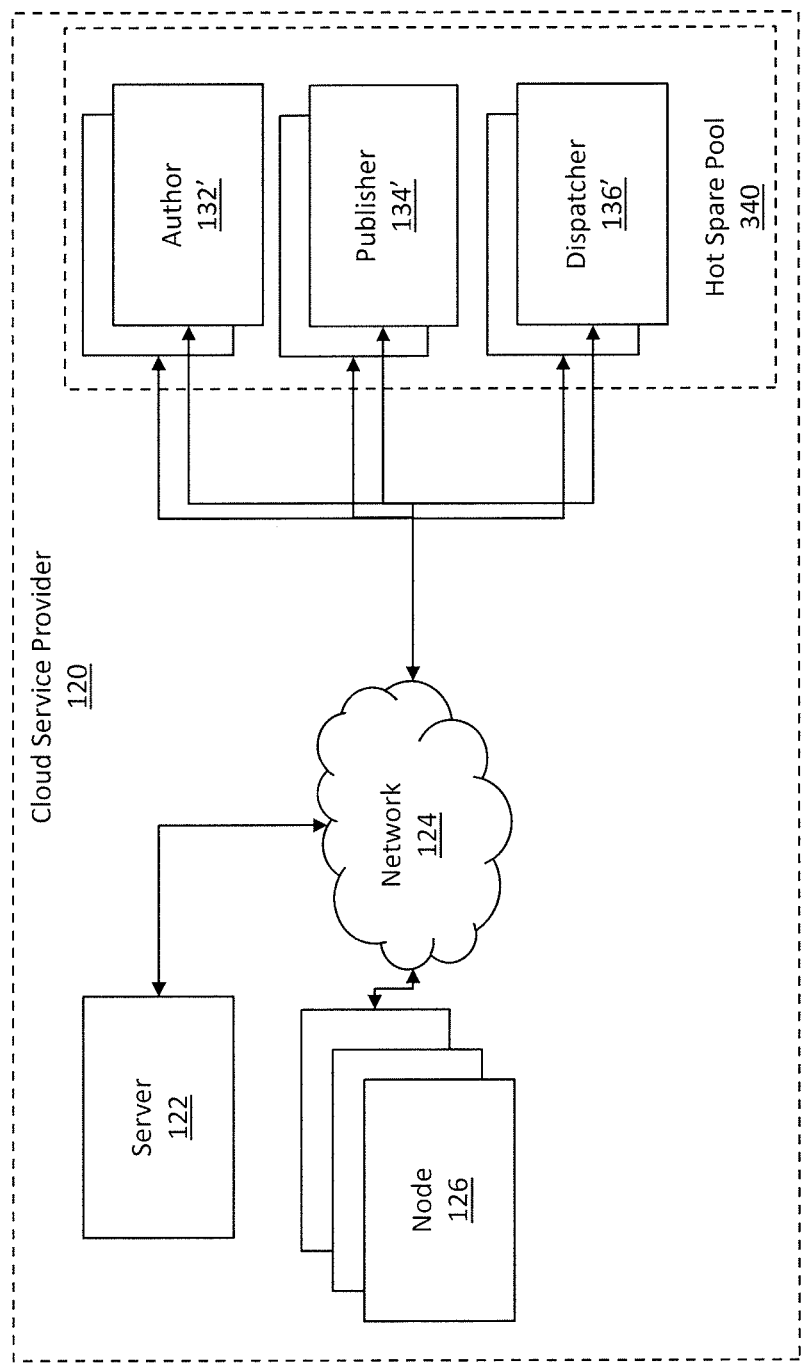
Figure 3B:
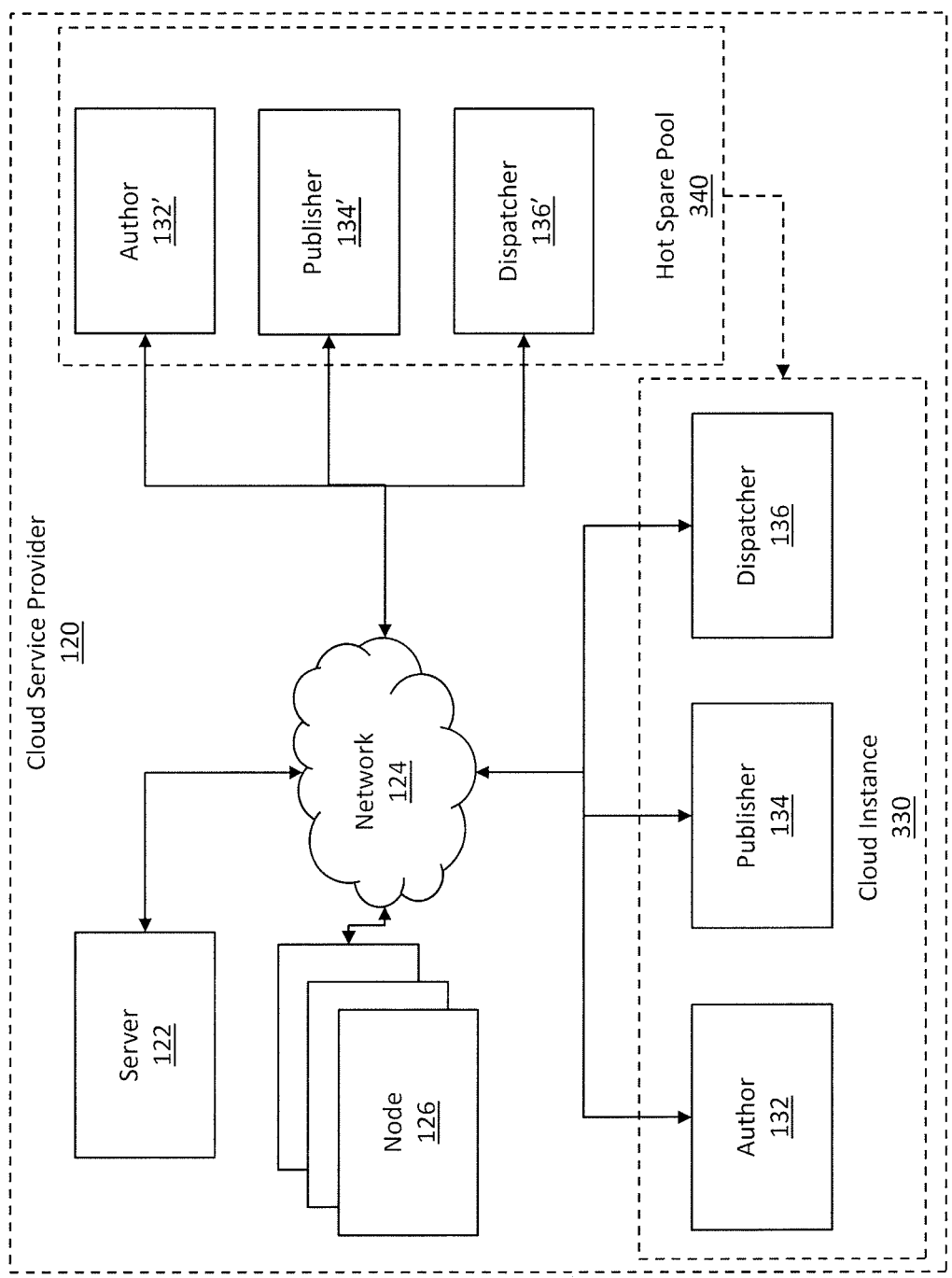
Figure 3C:
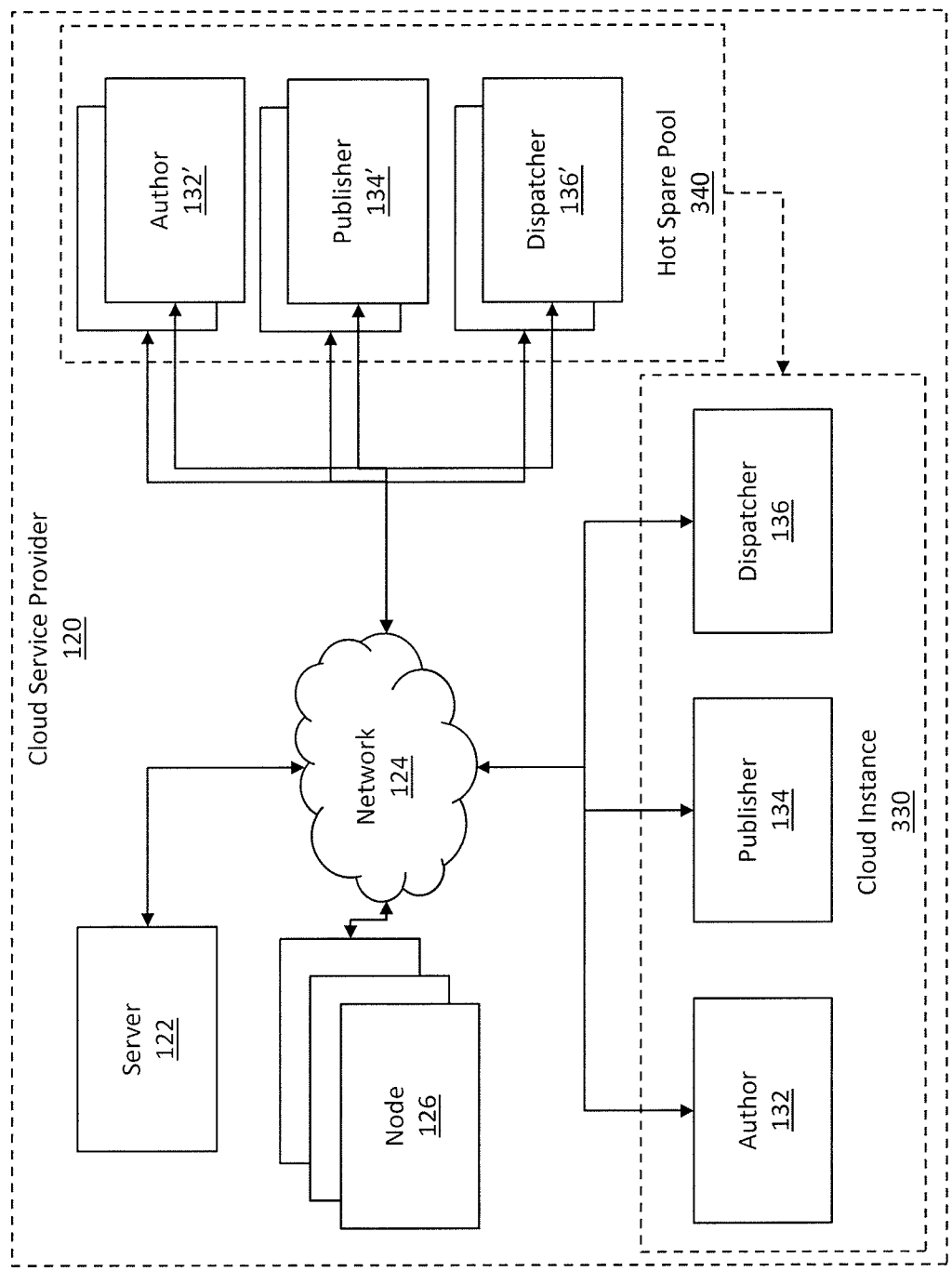

Referring now to FIGS. 3A-C, FIGS. 3A-C show a system for providing hot spare nodes according to one embodiment. In the embodiment shown in FIG. 3A, a user has configured a hot spare pool 340 comprising a plurality of author 132', publisher 134', and dispatcher 136' nodes. The user later configures a cloud instance to include 1 each of an author node, a publisher node, and a dispatcher node and issues a command to create the cloud instance. Upon receipt of the command, a software application (discussed in greater detail below) creates the cloud instance by using three nodes from the hot spare pool 340 to create the cloud instance 330. As can be seen in FIG. 3B, 1 each of an author node 132, a publisher node 134, and a dispatcher node 136 has been transitioned from the hot spare pool 340 to the new cloud instance 330. As discussed earlier, such a transition results in the hot spare pool 340 having fewer than a configured number of nodes, and thus, replacement nodes are generated. As can be seen in FIG. 3C, the replacement nodes have been generated for the hot spare pool 340, while the cloud instance 330 has been created and is operational. Such an embodiment may allow for very fast creation of new cloud instances. Each of the nodes desired for the cloud instance was available and creation of the new cloud instance simply required transitioning the desired number of nodes into the new cloud instance and performing any final configurations needed to prepare the cloud instance for use. Such a system may allow creation of a new cloud instance in a matter of a few seconds rather than configuring new nodes from scratch, which can take 20-30 minutes or more.

Figure 4:
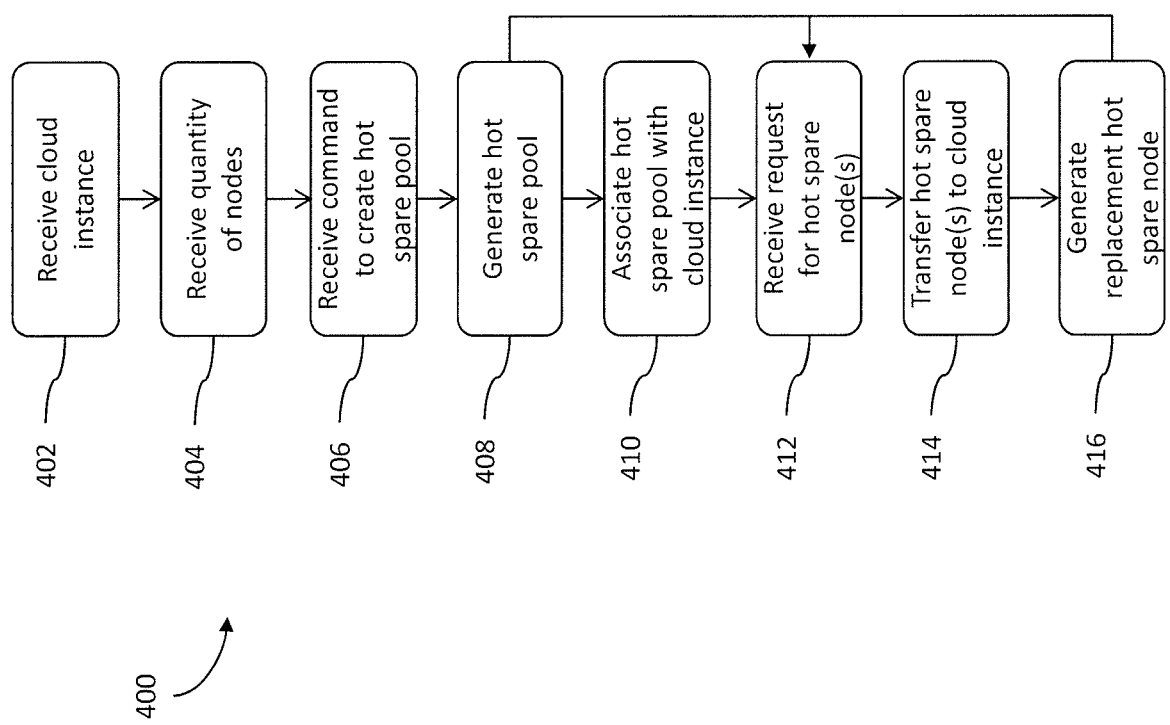
FIG. 4 shows a method for providing hot spare nodes according to one embodiment of this disclosure.

Referring now to FIG. 4, FIG. 4 shows a method 400 according to one embodiment of this disclosure. The method 400 of FIG. 4 will be described with respect to the system 100 shown in FIGS. 3A-C, but is not restricted to use only on the system 100 of FIGS. 3A-C. Other systems according to this disclosure are also suitable for performing the method 400 of FIG. 4, such as the embodiment shown in FIGS. 1A-2C. The method 400 described in FIG. 4 is embodied within a software application written in program code configured to be executed by a processor.

The method 400 begins in block 402 when a user logs into a software application for providing hot spare nodes. For example, in one embodiment, a user accesses a web-based application by using a web browser. In one embodiment, the user executes an application on a local computer system. In one embodiment, the user provides access information to a CSP. For example, in one embodiment, a user accesses a web-based software application for providing hot spare nodes hosted by a third-party cloud management service provider. Such a service provider may allow a user to access and manage cloud instances hosted in multiple different CSPs. In one such embodiment, a user provides access information for a CSP to which the user desires to access, such as to create a hot spare pool.

After accessing the software application, the user selects an option to create a new hot spare pool. In one embodiment, the user is prompted to specify a cloud instance to associate the new hot spare pool with; however, in some embodiments, the hot spare pool may be generated independently of any cloud instances. For example, a hot spare pool may be generated in anticipation of subsequent needs for one or more cloud instances. Thus, in some embodiments, no cloud instance may be identified.

In some embodiments, the software presents the user with a screen requesting the user identify one or more existing cloud instances with which the hot spare pool should be associated. For example, in one embodiment, the user may be presented with a graphical listing of available cloud instances to which the user has access or for which the user is an administrator. In one embodiment, a user may access a software application executing within a cloud instance and thus the cloud instance is identified when the user accesses the software application. In another embodiment, a user may enter a name or a numeric identifier for a cloud instance to identify the cloud instance. After a cloud instance has been identified, the method proceeds to block 404.

In block 404, the application receives an indication of a quantity of unallocated nodes. In the embodiment in FIG. 1A, the application receives the indication of the quantity of unallocated nodes from the user. For example, in one embodiment, a user may select a graphical icon showing different node types, select a node type, such as an authoring node, from a drop down menu and enter a quantity, such as '2,' in a numeric field associated with the selected node type. The user may then specify a quantity of unallocated nodes to be configured for each available node type. For example, a user may specify 2 authoring nodes, 4 publisher nodes, and 2 dispatcher nodes by selecting the appropriate node type and entering a numeric value or adjusting a slider to the desired quantity. In some embodiment, a user may select from a plurality of different node configuration types, such as storage nodes, rendering engine nodes, media player nodes, data processing nodes, office application nodes, database nodes, and other types of nodes known to one of skill in the art. In some embodiments, the application may provide default quantity values for each selected node type, such as '1' or '2' for each node type. In other embodiments, the software application may read a configuration file that specifies the quantity of each node type to include in a hot spare pool or the application may request the quantity from another source, such as a configuration server. After the application has received the quantity of unallocated nodes, the method proceeds to block 406.

In block 406, the application receives a command configured to create a hot spare pool and to cause the first quantity of unallocated nodes to be configured as a first quantity of configured nodes. In the embodiment shown in FIG. 1A, the application provides a button within a graphical user interface (GUI) to create a hot spare pool using the specified quantities of each selected node type. The application then receives the command when the user presses the button. In another embodiment, the application may automatically create the hot spare pool when a quantity is received from a configuration server for each node type.

In this embodiment, the command is configured to cause a quantity of unallocated nodes to be allocated from the pool of unallocated nodes provided by the CSP. For example, in this embodiment, the software application requests nodes of the type specified by the user (e.g. high-capacity nodes) from the CSP. To request the nodes, the software application may employ an application programming interface (API) provided by the CSP for accessing resources provided by the CSP. For example, in one embodiment, CSP may provide an API with commands for logging into the CSP using access credentials, requesting one or more unallocated nodes from the CSP, requesting information about node types offered by the CSP, logging into one or more nodes allocated to the software application by the CSP, starting a node within a cloud instance, suspending a node within a cloud instance, and stopping or releasing one or more nodes that are no longer needed back to the CSP.

After requesting the nodes, the software application receives information about each of the allocated nodes, such as network addresses (e.g. IP address) and properties of the nodes (such as number of processors and quantities of available memory and storage). The software application then causes each of the allocated nodes to be configured according to the quantities identified in block 404. For example, if a user had specified 4 publisher nodes, 2 author nodes, and 2 dispatcher nodes, the software application would cause 8 allocated nodes to be allocated from the pool of unallocated nodes. The software application would then issue one or more commands to configure the 8 allocated nodes as 4 publisher nodes, 2 author nodes, and 2 dispatcher nodes. For example, the software application would cause one or more software package to be copied to each of the 8 nodes. Such a software package may include software for creating a virtual machine, installing one or more applications to execute within the virtual machine, and executing one or more scripts to configure the virtual machine or the one or more applications. In some embodiments, the same software package may be copied to each allocated node and one or more configuration scripts may be executed to appropriate configure each respective node. In some embodiments, different software packages may be employed, such as software packages with pre-configured functionality according to a particular node type. Additional details regarding installation and configuration of one or more nodes may be found within co-pending U.S. patent application Ser. No. 13/572,330, entitled "Systems and Methods for Cloud Management," the entirety of which has been incorporated herein by reference. After receiving the command to create the hot spare pool, the method 400 proceeds to block 408.

In block 408, the generates the hot spare pool, the hot spare pool comprising the first quantity of configured nodes. In the embodiment shown in FIG. 1A, after each of the allocated nodes has been configured, the software application receives a notification as each node is configured. After a node has been configured and the software application receives the notification, the software application stores information regarding the node, such as an IP address and administrative information (such as an administrative login name and password), within a data structure defining the hot spare pool. For example, a hot spare pool may comprise a data structure that stores information about the hot spare pool, such as a name or identification information about the hot spare pool, a size of the hot spare pool, a number of configured nodes within the hot spare pool, information about each node comprising the pool, status information about each node comprising the pool.

As each node for the hot spare pool is allocated and configured, the software application stores information about each node within the hot spare pool data structure as well as a status for each node. Once all nodes allocated for the pool have been configured, the hot spare pool data structure is updated to indicate that the hot spare pool has been configured and is available to be used. After the hot spare pool has been generated, if a cloud instance has been identified the method proceeds to block 410, otherwise the method proceeds to block 412.

In block 410, the hot spare pool is associated with the one or more identified cloud instances. For example, the hot spare pool data structure may be updated to store information about the identified cloud instance, including a name or identifier of the cloud instance, configuration information about the cloud instance, such as where data describing the cloud instance is maintained such that such data can be updated if one or more nodes from the hot spare pool is added to the cloud instance, as will be described in greater detail below. In some embodiments, information about the hot spare pool may be provided to the cloud instance, such as to enable the cloud instance to automatically request one or more nodes from the hot spare pool. In some embodiments, the hot spare pool may be associated with a plurality of cloud instances. For example, in one embodiment, a plurality of cloud instances may be generated, each comprising one or more node types. A hot spare pool generated according to some embodiments of this disclosure may comprise configured nodes usable by each of the plurality of cloud instances and thus, the hot spare pool may be associated with each of the plurality of cloud instances to provide one or more hot spare nodes if they are needed at a later time. After the hot spare pool has been associated with a cloud instance, the method proceeds to block 412.

In block 412, the software application receives a request for at least one configured node from the hot spare pool. For example, in one embodiment, a user may wish to create a new cloud instance using one or more nodes from the hot spare pool. In such an embodiment, the software application may prompt the user to identify the quantity and types of nodes to be used to construct a new cloud instance. In another embodiment, the user may determine that a cloud instance needs additional nodes to handle processing loads within the cloud instance. The user may select an option within the software application to identify one or more nodes in the hot spare pool to be moved to the cloud instance. In one embodiment, the request for the nodes may be automatically generated by an associated cloud instance. After receiving the request for the at least one configured node from the hot spare pool, the method proceeds to block 414.

In block 414, the at least one configured node is transferred to the cloud instance from the hot spare pool. For example, in one embodiment, a user may specify that a new cloud instance should be created using nodes from the hot spare pool. In one such an embodiment, nodes corresponding to the types selected by the user and in the quantities identified by the user are selected from the hot spare pool and are allocated to a new cloud instance. For example, in one embodiment a user may select, such as during block 412, three nodes to be included in a new cloud instance, one each of an author node, a publisher node, and a dispatcher node. After the user enters the quantities and types of nodes to be used to create the new cloud instance, the application selects configured nodes from the hot spare pool 340 corresponding to the types and quantities specified by the user.

While in some embodiments, a new cloud instance may be created using nodes from a hot spare pool, in some embodiments, a hot spare pool may be associated with one or more cloud instances as discussed above. Thus, one or more configured nodes from a hot spare pool may be transitioned to an existing cloud instance. For example, in one embodiment, a configured hot spare node is incorporated into a cloud instance, such as by updating cloud instance information and by performing additional configuration operations on the at least one configured hot spare node. For example, the hot spare node may be configured with user account information for the cloud instance, may have cloud instance clustering configuration files installed, may have its network address updated to be associated with the associated cloud instance. In one embodiment, cloud instance information may be update with information about the at least one configured hot spare node, such as the type of the node and the network address of the node. In other embodiments, additional configuration processes may be executed to prepare the at least one configured hot spare node to be integrated into the cloud instance. After the configuration process is completed, the at least one hot spare node becomes a cloud instance node and the transfer is complete. In this embodiment, once the at least one configured node has been transferred to the cloud instance, the method proceeds to block 416.

In block 416, the software application generates one or more replacement hot spare nodes to replace the one or more nodes transferred to the cloud instance. For example, in one embodiment, a hot spare pool is configured to maintain a configured number of hot spare nodes. Thus, after a hot spare node is transferred to a cloud instance, the hot spare pool has fewer than the specified number of hot spare nodes. To generate one or more replacement nodes, the software application determines the number and type of nodes to be generated and executes portions of the method of FIG. 4 to request unallocated nodes, to configure the allocated nodes as needed, and to include the configured replacement nodes within the hot spare pool. For example, in one embodiment, the software application may execute steps according to blocks 404, 406, and 408 of the embodiment shown in FIG. 4. IN such an embodiment, the quantity of nodes is specified based on the number of nodes transferred to the cloud instance, and the command to create the hot spare pool comprises a command to replenish the hot spare pool and to configured newly-allocated nodes based on the number and types of nodes transferred to the cloud instance. After the replacement hot spare nodes have been generated and included within the hot spare pool, the method returns to block 412 and may accommodate a further request for one or more hot spare nodes.

The embodiments described above with respect to FIG. 4 describe a serial execution of various method steps. However, one or more of the blocks in FIG. 4 may be executed out of order or in parallel. For example, a hot spare pool may be associated with a cloud instance before any nodes have been allocated or configured. Further, when hot spare nodes are transferred to a cloud instance, replacement nodes may be generated as soon as the transfer process begins. Further, hot spare nodes may be requested and transferred before all nodes within a hot spare pool have been configured. For example, in one embodiment, as soon as a hot spare node has been configured (either as a part of the initial configuration of the hot spare pool, or as a part of the process of generating replacement nodes), it may be transferred to a cloud instance, even if other hot spare nodes are being configured. Further, in some embodiments, a user may re-configure a hot spare pool on the fly, such as by increasing the quantity of one or more node types to be maintained within the hot spare pool. For example, if in one embodiment, a hot spare pool is initially configured to maintain 4 publisher nodes, a software application may later change the configuration to specify that the hot spare pool should maintain 6 publisher nodes, or should only maintain 2 publisher nodes. In such a case, if additional nodes are needed, the software application may allocate and configure the additional nodes. Alternatively, if fewer nodes than are being maintained are needed, the software application may release one or more nodes to back to the CSP to be available as unallocated nodes.

Embodiments according to the present may provide one or more advantages to users of cloud instances. For example, a process of allocating and configuring a node for a cloud instance may take a significant amount of time, such as 20 or more minutes, while the process of transferring a node from a hot spare pool may take only a few seconds. Thus, embodiments may provide the capability to quickly expand the capabilities of a cloud instance by providing access to pre-configured nodes. Further, by automatically replenishing one or more nodes in the hot spare pool, the hot spare pool can perform such lengthy configuration process before additional nodes may be needed within a cloud instance and maintain a pool of readily available configured nodes.

GENERAL

While the methods and systems herein are described in terms of software executing on various machines, the methods and systems may also be implemented as specifically-configured hardware, such a field-programmable gate array (FPGA) specifically to execute the various methods. For example, referring again to FIGS. 4 and 5, embodiments can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to "one embodiment" or "an embodiment" means that a particular feature, structure, operation, or other characteristic described in connection with the embodiment may be included in at least one implementation of the disclosure. The disclosure is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method comprising:
    configuring a computing device to display a user interface for accessing a cloud instance operated by a cloud service provider and accessible by client devices via the cloud service provider, the cloud instance comprising (a) a set of authoring cloud nodes configured that provides user devices with access to authoring software that creates web content, (b) a set of publisher cloud nodes that provides Internet access to content created with the authoring software, and (c) a dispatcher cloud node configured for a load-balancing function that allocates processing loads among the set of publisher cloud nodes
    receiving, via the user interface, a user request to create a hot spare pool of configured nodes, the user request comprising an indication of a quantity of unallocated nodes for the hot spare pool and specifying that the unallocated nodes are to be configured as additional nodes with the authoring function, additional nodes with the publishing function, and an additional node with the load-balancing function, the unallocated nodes being available for use as additional cloud nodes but not allocated or configured to the cloud instance;
    responsive to receiving the user request, generating the hot spare pool in an offline and standby state by configuring the quantity of unallocated nodes as the additional nodes with the authoring function, the additional nodes with the publishing function, and the additional node with the load-balancing function, wherein:
    generating the hot spare pool comprises:
        transmitting, via an application programming interface of a cloud server provider, a command to log into the cloud server provider,
        receiving, responsive to the command, address information for the unallocated nodes via the application programming interface, and
        storing login information and the address information in a data structure identifying the hot spare pool,
        configuring the additional nodes with the authoring function for the hot spare pool comprises installing a first software package that implements the authoring function,
        configuring the additional nodes with the publisher function for the hot spare pool comprises installing a second software package that implements the publishing function, and
        configuring the additional node with the load-balancing function for the hot spare pool comprises installing a third software package that implements the load-balancing function;
    receiving, via the user interface and subsequent to creating the hot spare pool, a request for increasing capacity of the cloud instance by activating at least one of the configured nodes of the hot spare pool, the at least one of the configured nodes comprising at least one of an additional node with the authoring function, an additional node with the publishing function, or the additional node with the load-balancing function; and
    responsive to the request for increasing capacity, transferring the at least one of the configured nodes from the hot spare pool to the cloud instance while the cloud service provider continues to provide the client device with access to the cloud instance, wherein transferring the at least one of the configured nodes to the cloud instance comprises (i) modifying a network address of the at least one of the configured nodes such that the modified network address corresponds to the cloud instance and (ii) registering the at least one of the configured nodes with a dispatcher node for the cloud instance.

2. The method of claim 1, further comprising, responsive to transferring the at least one of the configured nodes from the hot spare pool to the cloud instance:
    identifying a quantity of the configured nodes transferred from the hot spare pool to the cloud instance when responding to the request for increasing capacity; and
    causing an additional quantity of replacement nodes to be configured and added to the hot spare pool, the additional quantity of replacement nodes being the same as the quantity of the configured nodes transferred from the hot spare pool to the cloud instance.

3. A non-transitory computer-readable medium comprising program code, the program code configured to cause a processor to perform operations comprising:

configuring a computing device to display a user interface for accessing a cloud instance operated by a cloud service provider and accessible by client devices via the cloud service provider, the cloud instance comprising (a) a set of authoring cloud nodes configured for an authoring function that provides user devices with access to authoring software that creates web content, (b) a set of publisher cloud nodes configured for a publisher function that provides Internet access to content created with the authoring software, and (c) a dispatcher cloud node configured for a load-balancing function that allocates processing loads among the set of publisher cloud nodes;

receiving, via the user interface, a user request to create a hot spare pool of configured nodes, the user request comprising an indication of a quantity of unallocated nodes for the hot spare pool and specifying that the unallocated nodes are to be configured as additional nodes with the authoring function, additional nodes with the publishing function, and an additional node with the load-balancing function, the unallocated nodes being unallocated computing hardware systems available for use as additional cloud nodes but not allocated or configured to the cloud instance;

generating, responsive to receiving the user request, the hot spare pool in an offline and standby state by configuring the quantity of unallocated nodes as the additional nodes with the authoring function, the additional nodes with the publishing function, and the additional node with the load-balancing function, wherein:

responsive to receiving the user request, generating the hot spare pool in an offline and standby state by configuring the quantity of unallocated nodes as the additional nodes with the authoring function, the additional nodes with the publishing function, and the additional node with the load-balancing function, wherein:

generating the hot spare pool comprises:

transmitting, via an application programming interface of a cloud server provider, a command to log into the cloud server provider, receiving, responsive to the command, address information for the unallocated nodes via the application programming interface, and storing login information and the address information in a data structure identifying the hot spare pool, configuring the additional nodes with the authoring function for the hot spare pool comprises installing a first software package that implements the authoring function, configuring the additional nodes with the publisher function for the hot spare pool comprises installing a second software package that implements the publishing function, and configuring the additional node with the load-balancing function for the hot spare pool comprises installing a third software package that implements the load-balancing function;

receiving, via the user interface and subsequent to creating the hot spare pool, a request for increasing capacity of the cloud instance by activating at least one of the configured nodes of the hot spare pool, the at least one of the configured nodes comprising at least one of an additional node with the authoring function, an additional node with the publishing function, or the additional node with the load-balancing function; and responsive to the request for increasing capacity, transferring the at least one of the configured nodes from the hot spare pool to the cloud instance while the cloud service provider continues to provide the client device with access to the cloud instance, wherein transferring the at least one of the configured nodes to the cloud instance comprises (i) modifying a network address of the at least one of the configured nodes such that the modified network address corresponds to the cloud instance and (ii) registering the at least one of the configured nodes with a dispatcher node for the cloud instance.

4. The non-transitory computer-readable medium of claim 3, the operations further comprising, responsive to transferring the at least one of the configured nodes from the hot spare pool to the cloud instance:

identifying a quantity of the configured nodes transferred from the hot spare pool to the cloud instance when responding to the request for increasing capacity; and causing an additional quantity of replacement nodes to be configured and added to the hot spare pool, the additional quantity of replacement nodes being the same as the quantity of the configured nodes transferred from the hot spare pool to the cloud instance.

5. A system comprising:

a non-transitory computer-readable medium; and a processor in communication with the non-transitory computer-readable medium, the processor configured to perform operations comprising:

configuring a computing device to display a user interface for accessing a cloud instance operated by a cloud service provider and accessible by client devices via the cloud service provider, the cloud instance comprising (a) a set of authoring cloud nodes configured for an authoring function that provides user devices with access to authoring software that creates web content, (b) a set of publisher cloud nodes configured for a publisher function that provides Internet access to content created with the authoring software, and (c) a dispatcher cloud node configured for a load-balancing function that allocates processing loads among the set of publisher cloud nodes;

receiving, via the user interface, a user request to create a hot spare pool of configured nodes, the user request comprising an indication of a quantity of unallocated nodes for the hot spare pool and specifying that the unallocated nodes are to be configured as additional nodes with the authoring function, additional nodes with the publishing function, and an additional node with the load-balancing function, the unallocated nodes being unallocated computing hardware systems available for use as additional cloud nodes but not allocated or configured to the cloud instance;

generating, responsive to receiving the user request, the hot spare pool in an offline and standby state by configuring the quantity of unallocated nodes as the additional nodes with the authoring function, the additional nodes with the publishing function, and the additional node with the load-balancing function, wherein:

responsive to receiving the user request, generating the hot spare pool in an offline and standby state by configuring the quantity of unallocated nodes as the additional nodes with the authoring function, the additional nodes with the publishing function, and the additional node with the load-balancing function, wherein:

generating the hot spare pool comprises:
transmitting, via an application programming interface of a cloud server provider, a command to log into the cloud server provider,
receiving, responsive to the command, address information for the unallocated nodes via the application programming interface, and
storing login information and the address information in a data structure identifying the hot spare pool, configuring the additional nodes with the authoring function for the hot spare pool comprises installing a first software package that implements the authoring function, configuring the additional nodes with the publisher function for the hot spare pool comprises installing a second software package that implements the publishing function, and configuring the additional node with the load-balancing function for the hot spare pool comprises installing a third software package that implements the load-balancing function;

receiving, via the user interface and subsequent to creating the hot spare pool, a request for increasing capacity of the cloud instance by activating at least one of the configured nodes of the hot spare pool, the at least one of the configured nodes comprising at least one of an additional node with the authoring function, an additional node with the publishing function, or the additional node with the load-balancing function; and responsive to the request for increasing capacity, transferring the at least one of the configured nodes from the hot spare pool to the cloud instance while the cloud service provider continues to provide the client device with access to the cloud instance, wherein transferring the at least one of the configured nodes to the cloud instance comprises (i) modifying a network address of the at least one of the configured nodes such that the modified network address corresponds to the cloud instance and (ii) registering the at least one of the configured nodes with a dispatcher node for the cloud instance.

6. The system of claim 5, the operations further comprising, responsive to transferring the at least one of the configured nodes from the hot spare pool to the cloud instance:
identifying a quantity of the configured nodes transferred from the hot spare pool to the cloud instance when responding to the request for increasing capacity; and
causing an additional quantity of replacement nodes to be configured and added to the hot spare pool, the additional quantity of replacement nodes being the same as the quantity of the configured nodes transferred from the hot spare pool to the cloud instance.

7. The method of claim 1, wherein the cloud nodes are computing hardware systems and the unallocated nodes are unallocated computing hardware systems.

8. The method of claim 1,
wherein configuring the computing device to display the user interface comprises configuring the computing device to display the user interface with:
a first interface element for selecting a node type from a set of node types that include the authoring function, the publisher function, and the load-balancing function, and
a second interface element for specifying node quantities;
wherein receiving, via the user interface, the user request to create the hot spare pool of configured nodes comprises:
receiving first input data via the first interface element identifying the authoring function, the publisher function, and the load-balancing function, and
receiving second input data via the second interface element identifying a quantity for the set of authoring cloud nodes, a quantity for the set of publisher cloud nodes, and a quantity for a set of nodes;
wherein receiving, via the user interface, the request for increasing capacity comprises:
configuring the computing device to display a prompt for a node quantity for a capacity increase and a node type for the capacity increase, and
receiving, via the user interface and responsive to the prompt, the node quantity for the capacity increase that is a quantity for the at least one of the configured nodes from the hot spare pool, and
receiving, via the user interface and responsive to the prompt, the node type for the capacity increase that identifies the at least one of the authoring function, the publishing function, or the load-balancing function.

9. The method of claim 8, wherein the second interface element is a slider interface element.

10. The method of claim 8, wherein the second interface element is a text field.

11. The non-transitory computer-readable medium of claim 3, wherein the cloud nodes are computing hardware systems.

12. The non-transitory computer-readable medium of claim 3,
wherein configuring the computing device to display the user interface comprises configuring the computing device to display the user interface with:
a first interface element for selecting a node type from a set of node types that include the authoring function, the publisher function, and the load-balancing function, and
a second interface element for specifying node quantities;
wherein receiving, via the user interface, the user request to create the hot spare pool of configured nodes comprises:
receiving first input data via the first interface element identifying the authoring function, the publisher function, and the load-balancing function, and
receiving second input data via the second interface element identifying a quantity for the set of authoring cloud nodes, a quantity for the set of publisher cloud nodes, and a quantity for a set of nodes;
wherein receiving, via the user interface, the request for increasing capacity comprises:
configuring the computing device to display a prompt for a node quantity for a capacity increase and a node type for the capacity increase, and
receiving, via the user interface and responsive to the prompt, the node quantity for the capacity increase that is a quantity for the at least one of the configured nodes from the hot spare pool, and
receiving, via the user interface and responsive to the prompt, the node type for the capacity increase that identifies the at least one of the authoring function, the publishing function, or the load-balancing function.

13. The non-transitory computer-readable medium of claim 12, wherein the second interface is a slider interface element.

14. The non-transitory computer-readable medium of claim 12, wherein the second interface is a slider interface element, wherein the second interface is a text field.

15. The system of claim 5, wherein the cloud nodes are computing hardware systems.

16. The system of claim 5,
wherein configuring the computing device to display the user interface comprises configuring the computing device to display the user interface with:
a first interface element for selecting a node type from a set of node types that include the authoring function, the publisher function, and the load-balancing function, and
a second interface element for specifying node quantities;
wherein receiving, via the user interface, the user request to create the hot spare pool of configured nodes comprises:
receiving first input data via the first interface element identifying the authoring function, the publisher function, and the load-balancing function, and
receiving second input data via the second interface element identifying a quantity for the set of authoring cloud nodes, a quantity for the set of publisher cloud nodes, and a quantity for a set of nodes;
wherein receiving, via the user interface, the request for increasing capacity comprises:
configuring the computing device to display a prompt for a node quantity for a capacity increase and a node type for the capacity increase, and
receiving, via the user interface and responsive to the prompt, the node quantity for the capacity increase that is a quantity for the at least one of the configured nodes from the hot spare pool, and
receiving, via the user interface and responsive to the prompt, the node type for the capacity increase that identifies the at least one of the authoring function, the publishing function, or the load-balancing function,
wherein generating the hot spare pool comprises:
transmitting, via an application programming interface of a cloud server provider, a command to log into the cloud server provider,
receiving, responsive to the request, address information for the unallocated nodes via the application programming interface.

17. The system of claim 16, wherein the second interface is a slider interface element.

18. The system of claim 16, wherein the second interface is a slider interface element, wherein the second interface is a text field.

* * * * *